(12) United States Patent
Lee et al.

(10) Patent No.: US 11,294,202 B2
(45) Date of Patent: Apr. 5, 2022

(54) CONTACT LENS FOR PRESBYOPIA

(71) Applicants: Seong Jun Lee, Daejeon (KR); Hyun Seung Lee, Daejeon (KR); Hyun Jeong Lee, Daejeon (KR)

(72) Inventors: Seong Jun Lee, Daejeon (KR); Hyun Seung Lee, Daejeon (KR); Hyun Jeong Lee, Daejeon (KR)

( * ) Notice: Subject to any disclaimer, the term of this patent is extended or adjusted under 35 U.S.C. 154(b) by 0 days.

(21) Appl. No.: 16/302,048

(22) PCT Filed: Jun. 28, 2017

(86) PCT No.: PCT/KR2017/006814
§ 371 (c)(1),
(2) Date: Nov. 15, 2018

(87) PCT Pub. No.: WO2018/030635
PCT Pub. Date: Feb. 15, 2018

(65) Prior Publication Data
US 2019/0171038 A1    Jun. 6, 2019

(30) Foreign Application Priority Data
Aug. 12, 2016 (KR) .................. 10-2016-0103029

(51) Int. Cl.
*G02C 7/06* (2006.01)
*G02C 7/02* (2006.01)
*G02C 7/04* (2006.01)

(52) U.S. Cl.
CPC ............. *G02C 7/066* (2013.01); *G02C 7/02* (2013.01); *G02C 7/027* (2013.01); *G02C 7/04* (2013.01);
(Continued)

(58) Field of Classification Search
CPC .......... G02C 7/04; G02C 7/041; G02C 7/042; G02C 7/043; G02C 7/044; G02C 7/045;
(Continued)

(56) References Cited

U.S. PATENT DOCUMENTS

| 5,971,542 A | 10/1999 | Volker et al. |
| 9,028,063 B2 | 5/2015 | Roffman et al. |

(Continued)

FOREIGN PATENT DOCUMENTS

| CN | 1879051 A | 12/2006 |
| JP | 11-024012 A | 1/1999 |

(Continued)

*Primary Examiner* — Marin Pichler
(74) *Attorney, Agent, or Firm* — Maschoff Brennan (57) ABSTRACT

The present invention relates to a contact lens for presbyopia and, more specifically, to a contact lens for presbyopia, providing both a far-distance vision area and a near-distance vision area in one contact lens, and continuously forming a lens magnification of the far-distance vision area and the near-distance vision area of the dominant eye and the non-dominant eye while changing the sizes of the far-distance vision area and the near-distance vision area of two eyes according to the dominant eye and the non-dominant eye, such that an intermediate-distance area is partially overlapped, thereby continuously providing a near-distance vision area at a far distance by a neural summation phenomenon that selects a clearly visible image in both eyes.

1 Claim, 11 Drawing Sheets

(52) U.S. Cl.
CPC .............. *G02C 7/042* (2013.01); *G02C 7/06* (2013.01); *G02C 7/047* (2013.01)

(58) Field of Classification Search
CPC .......... G02C 7/048; G02C 7/066; G02C 7/06; G02C 7/047; G02C 7/027
USPC ............... 351/159.02, 159.1, 159.12, 159.14
See application file for complete search history.

(56) References Cited

U.S. PATENT DOCUMENTS

| | | |
|---|---|---|
| 2005/0099595 A1* | 5/2005 | Lindacher ............ C07K 5/1021 351/159.09 |
| 2010/0026958 A1 | 2/2010 | Wooley et al. |
| 2012/0029631 A1* | 2/2012 | Wanders ................ G02C 7/042 623/6.27 |
| 2015/0331255 A1 | 11/2015 | Sankaridurg et al. |
| 2016/0357029 A1 | 12/2016 | Koo |

FOREIGN PATENT DOCUMENTS

| | | |
|---|---|---|
| KR | 10-2011-0042209 A | 4/2011 |
| KR | 10-2011-0118236 A | 10/2011 |
| KR | 10-2014-0054318 A | 5/2014 |
| KR | 10-2015-0005536 A | 1/2015 |
| KR | 10-1578327 B | 12/2015 |
| KR | 10-2018-0018085 A | 2/2018 |
| WO | 2015/115901 A1 | 8/2015 |

* cited by examiner

CONTACT LENS FOR PRESBYOPIA

TECHNICAL FIELD

The present invention relates to a contact lens for presbyopia and, more specifically, to a contact lens for presbyopia, providing both a far-distance vision area and a near-distance vision area in one contact lens, and continuously forming a lens magnification of the far-distance vision area and the near-distance vision area of the dominant eye and the non-dominant eye while changing the sizes of the far-distance vision area and the near-distance vision area of two eyes according to the dominant eye and the non-dominant eye, such that an intermediate-distance area is partially overlapped, thereby continuously providing a near-distance vision area at a far distance by a neural summation phenomenon that selects a clearly visible image in both eyes.

DESCRIPTION OF THE RELATED ART

In general, human eyes have a structure similar to that of cameras. The human eye consists of the cornea, sclera, iris, lens, retina, and ciliary body etc. The cornea and sclera are the front parts of the eye, the iris is placed in the cornea and sclera and functions as a diaphragm in a camera by controlling the amount of light, the lens bends light rays so as to form a clear image on the retina like a lens in a camera, the retina is sensitive to light and allows images from the outside to come into focus like a film in a camera, and the ciliary body changes the thickness of the lens and adjusts distances so as to allow the image of an object to be exactly formed on the retina.

Unlike a camera in which a glass lens moves forward and backward so as to adjust the distance between a lens and a film and to allow the image of an object to come into focus, the thickness of the lens of the human eye is adjusted by the ciliary body so as to allow the image of an object to be formed exactly on the retina in the state where the lens of the human eye is in its place.

That is, the lens has the shape of an elastic convex lens shape which is about 4 mm thick, and controls the refraction of light coming through the pupil. When an object such as a letter or a thing etc. is at a close distance, the ciliary body contracts, the lens thickens, and the refraction of light increases, and when an object is at a long distance, the ciliary body relaxes, the lens becomes thin, and the refraction of light decreases. The lens contracts and relaxes repeatedly so as to focus on objects at different distances.

As described above, the human eye performs complex functions, and the functions largely consist of minimum visible acuity, minimum resolvable acuity, minimum legible acuity, and minimum discriminable acuity.

Minimum visible acuity can be said to be closely related to the sensitivity of the retina. In minimum visible acuity, the amount of light and background are important factors rather than the size of an object. That is, contrast is an important factor.

Minimum resolvable acuity is the ability to discriminate two separate points or lines and is often referred to as resolution acuity. Minimum separable acuity means visual acuity. This may be called a minimum angle of resolution, minimum separability. The threshold value is 30 to 60 seconds for normal people. In the visual cells of the retina, the size of cones in the macula ranges from 1.0 to 4.0 µm. In order for the eyes to discriminate two separate objects, a distance between tow images formed on the retina is at least 1.5 or more µm, and the distance denotes a visual angel of 20 seconds. However, a minimum angle of a normal person ranges from 30 to 60 seconds clinically because of a light pattern caused by diffraction of light etc. Landolt's ring test is a typical method for measuring the time period. This was recognized for the first time as a standardized visual acuity measurement at European Congress which was held in 1909. For instance, when seeing a ring with a diameter of 7.5 mm, a width of 1.5 mm and a gap of 1.5 mm, a person with visual acuity of 1.0 can recognize the direction of the gap at a distance of 5 m but cannot recognize smaller visual charts. The gap of 1.5 mm at the distance of 5 m denotes a visual angle of 60 seconds. Visual acuity is expressed as an inverse number of a minimum visual angle. For instance, a person with visual acuity of 0.5 has a minimum visual angle of 2 minutes at a distance of 5 m, a person with visual acuity of 0.1 has a minimum visual angle of 10 minutes at a distance of 5 m, and a person with visual acuity of 2.0 has a minimum visual angle of 30 seconds at a distance of 5 m.

Minimum legible acuity refers to an ability to recognize letters, numbers or shapes and relies on psychological factors (intelligence, attention, experience etc.) in addition to physiological factors.

Minimum discriminable acuity is the ability to determine what an object is, where the object is, whether the object moves, how the object is arranged, where the object is inclined etc. Minimum discriminable acuity includes vernier acuity, tilt detection acuity, motion detection acuity, and stereoacuity. Recognition is performed at a distance in one cell (about 20 to 30 seconds) and thus considered to be performed through other phenomena other than minimum resolvable acuity and minimum legible acuity etc.

Additionally, when the pupil becomes smaller, the lens becomes thicker. Thus, a focal depth (depth of focus) increases and better visual acuity can be achieved even though refractive errors are not completely corrected. That is why those with myopia frown to see things. However, when the pupil becomes too small (0.1 to 1 or less mm), the diffraction of light occurs, and lighting of the retina decreases. Therefore, visual acuity drops. In the case where the diameters of the pupil range from 2.5 mm to 6 mm, there is almost no difference. However, when the diameter of the pupil becomes larger than the above-described figures, spherical aberration affects visual acuity, and visual acuity drops.

When seeing an object at a close distance or at a long distance, the lenses of healthy eyes are automatically adjusted to focus on the object while the lenses of aged eyes lose their elasticity and cannot change their thickness. Thus, when seeing an object at a close distance, the lenses of aged eyes cannot focus on the object, and the object blurs.

Glasses, contact lenses or eye surgeries are used to correct presbyopia. Presbyopia is easily corrected with glasses having multi focus lenses, where one lens has various degrees, such that objects at a close distance, at an intermediate distance and at a long distance are clearly seen, while presbyopia is not easily corrected with contact lenses.

Further, as a contact lens for presbyopia, there is a type of a multi focus contact lens in which a plurality of circles are arranged by configuring convex lenses and concave lenses as concentric circles. This sort of contact lens is highly affected by changes in the sizes of the pupil. Additionally, the brightness of light decreases. When the central portion of the lens is not in accordance with an axis, irradiation and glare can occur, Further, compared to a single focus lens, the multi focus lens can cause side effects such as decreased contrast sensitivity, impaired night vision, and neural adaptation etc. due to optical properties.

Further, in both eyes, the refractive index of a contact lens for presbyopia is 0 D(diopter) at a far distance and 2.0 to 3.0 D at a near distance. Thus, there exists an intermediate vision area where an object is not clearly seen. Additionally, double vision and visual confusion can occur because various images at near and far distances are formed on each eye.

South Korean Patent Laid-Open Publication No. 10-2011-0118236 (published on Oct. 31, 2011, "Prior Document 1") discloses progressive hard contact lenses for presbyopia. Prior Document 1 relates to progressive hard contact lenses for presbyopia including a lens center far distance part for a far distance formed at the center of the lens, and a lens peripheral near distance part for a near distance formed at the peripheral of the lens center far distance part. According to progressive hard contact lenses for presbyopia in Prior Document 1, a near distance and a far distance for both eyes have an identical degree range. Therefore, images cannot be continuously recognized from a far distance to a near distance because an intermediate area where an object is not clearly seen is placed between a near distance and a far distance.

South Korean Patent No. 10-1578327 (registered on Dec. 12, 2015, "Prior Document 2") discloses a contact lens for presbyopia. Prior Document 2 relates to a contact lens for presbyopia which includes a far distance part having far distance refractive power, a near distance part having near distance refractive power, and a lens body contacting the cornea, wherein the lens body is divided in the shape of a concentric circle, in up-down and left-right directions such that far distance and near distance focuses are simultaneously matched when the lens body escapes from the center of the cornea, and the far distance part and the near distance part are formed alternately and repeatedly at every contacted division, wherein the far distance part of the lens body has degrees ranging from −10.0 to 4.0 D while the near distance part of the lens body has degrees ranging from 1.0 to 4.0 D, wherein the surface of the lens body has 15,000~16,000 of air holes for air flow and a supply of nutrients, and the air hole is 8~12 μm in size. According to a contact lens for presbyopia in Prior Document 2, a near distance and a far distance for both eyes have an identical or similar degree range. Therefore, images cannot be continuously recognized from a far distance to a near distance because an intermediate area where an object is not clearly seen is placed between a near distance and a far distance.

Therefore, there is a need to carry out research into a new sort of contact lens that can achieve better visual acuity at an intermediate area between a far distance and a near distance.

DETAILED DESCRIPTION OF THE INVENTION

Technical Problems

The present invention is directed to providing a contact lens for presbyopia, in which both eyes are divided into a dominant eye and a non-dominant eye, contact lenses used for both eyes are configured to have different refractive dices while a certain area is overlapped so as to increase a focal depth that improves visibility at an intermediate area between a far distance and a near distance, thereby making it possible to minimize the areas which are not clearly seen on both eyes due to presbyopia.

Technical Solutions

As a means to achieve the above-described purposes, a contact lens for presbyopia of the present invention, which has a far-distance part having a far-distance refractive index, and a near-distance part having a near-distance refractive index, both of which are respectively formed in divided areas of the contact lens, includes a central area configured as a far-distance refractive index and providing a main visual field; a finish area 30 having a ring shape and formed along an edge of the contact lens; an optical area formed between the central area and the finish area and having refractive power so as to provide a vision area, wherein the optical area has a sector shape with a certain angle and divides a far-distance part that is an upper area and a near-distance part that is a lower area, and a transition part with a certain width is formed at a boundary between the far-distance part and the near-distance part and alleviates differences in thickness caused by different refractive indices.

In the optical area, the far-distance part and near-distance part of a dominant eye form refractive indices respectively in a 210 degree range and a 150 degree range so as to be symmetrical in a left-right direction, the far-distance part and near-distance part of a non-dominant eye provide refractive indices respectively in a 150 degree range and a 210 degree range so as to be symmetrical in a left-right direction, and the transition part alleviates differences in thickness in a range of 3 to 7 degrees.

For instance, in terms of refractive indices in the optical area at the time of wearing the lens, an intended refractive index of the far-distance part of the dominant eye is configured as emmetropia; an intended refractive index of the near-distance part of the dominant eye is configured as −0.75 D; an intended refractive index of the far-distance part of the non-dominant eye is configured as −0.50 D; an intended refractive index of the near-distance part of the non-dominant eye is configured as −2.25 D.

Advantageous Effects

According to a contact lens for presbyopia of the present invention, as a means to solve the above-described problems, both eyes are divided into a dominant eye and a non-dominant eye, contact lenses used for the divided eyes are configured to have different degrees while an intermediate area is partially overlapped with an increase in a focal depth so as to improve visual acuity at the intermediate area, a blend zone that is an intermediated zone alleviates differences in refractive indices of a far-distance area and a near-distance area, thereby making it possible to improve the adaptation of a user.

Further, when scopes of a far-distance area and a near-distance area are set in a contact lens, the proportions of the far-distance area to the near-distance area are different depending on a dominant eye and a non-dominant eye. Thus, the range of vision is expanded because of a phenomenon in which one of the images formed on both eyes, which is clearly seen, is selected and recognized when contact lenses are worn on both eyes, thereby improving the adaptation of a user.

BEST MODE FOR CARRYING OUT THE INVENTION

The present invention will be described in detail with reference to the attached drawings. However, the attached drawings will be provided only as examples to easily describe the technical spirit and scope of the present invention and are not intended to limit or modify the technical scope of the present invention. Further, it is apparent to those skilled in the art to which the present invention pertains that the present invention may be modified and changed in various forms on the basis of the examples without departing from the scope of the technical spirit of the present invention.

Figure 1:
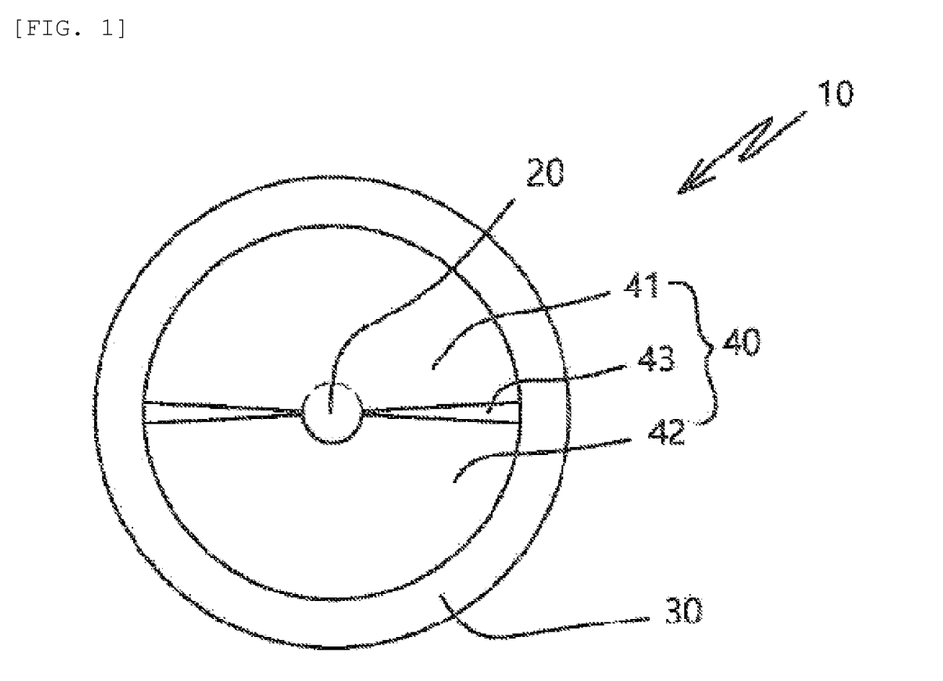
FIG. 1 is a plane view of a contact lens for presbyopia according to an embodiment of the present invention.

FIG. 1 is a plane view of a contact lens for presbyopia according to an embodiment of the present invention.

A contact lens for presbyopia 10 according to the present invention is configured to contact the cornea of a user who wears the contact lens, and an inner surface of the contact lens for presbyopia is configured to correspond to the surface of the cornea of the user.

The contact lens has a circular shape with a total diameter of 12.6 mm or so, and the inner surface of the contact lens is curved.

The contact lens 10 is divided into three areas: a central area 20 where a pupil is positioned, a finish area 30 which is formed at an edge of the contact lens, and an optical area 40 which is interposed between the central area and finish area and where a refractive index is formed.

The central area 20 is configured to have a diameter of 1.5 to 1.7 mm and have a far-distance refractive index that is a major visual field. Preferably, the central area has a constant diameter of 1.6 mm such that eyes easily adapt at the time when contact lenses are replaced.

Further, the finish area 30 is configured to have a ring shape, is formed at the edge of the contact lens, is configured to have a width of 1.3 mm or so, and is configured to have an aspheric surface such that a wearer feels no discomfort.

Further, the optical area 40 has a diameter of 10.0 mm or so and corresponds to an area excluding the central area. The optical area 40 forms different refractive indices and includes a far distance part 41 used to see distant objects and a near-distance part 42 used to see close objects. In this case, preferably, the far-distance part 41 is connected with the central area 20 and formed at an upper area of the optical area while the near-distance part 42 is formed at a lower area of the optical area.

Additionally, a transition part 43 is further formed between the far-distance part 41 and the near-distance part 42 in the optical area 40 so as to alleviate differences in thickness caused by different refractive indices.

In the optical area, the far-distance part 41, the near-distance part 42, and the transition part 43 may be divided in an up-down direction on the basis of a horizontal line, in a left-right direction on the basis of a vertical line or in various ways. However, the optical area is preferably divided into sectors according to a certain angle on the basis of the center of a circle.

For instance, the far-distance part 41 that is an upper area, and the near-distance part 42 that is a lower area are divided in an up-down direction on the basis of a horizontal line, and similarly have an angle of 180 degrees, and a sector-shaped transition part 43 with a central angle of 5 degrees or so is formed between the far-distance part and the near-distance part so as to alleviates difference in refractive indices, as illustrated in FIG. 1.

Figure 2:
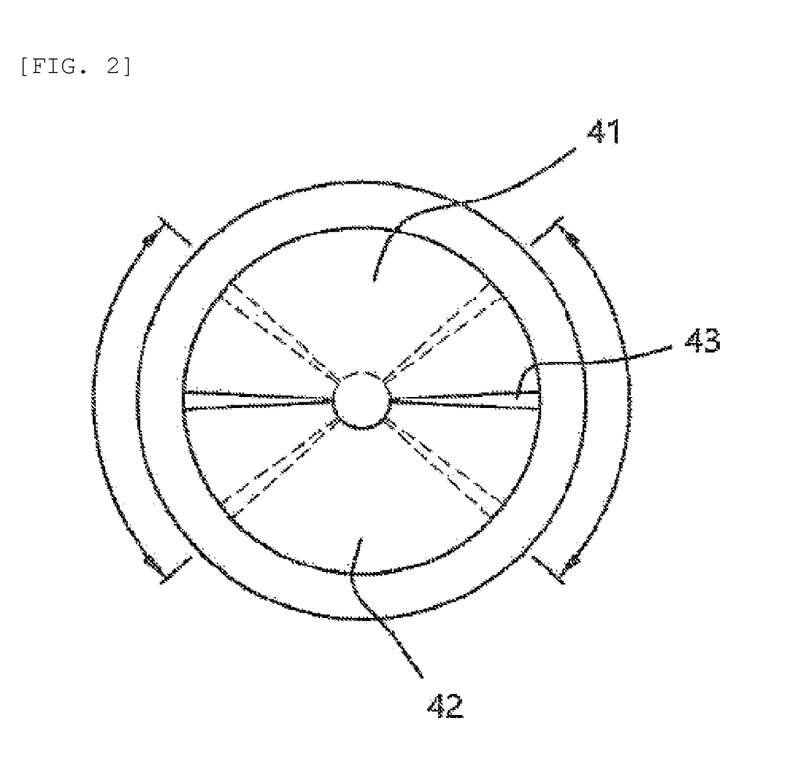
FIG. 2 is a plane view of a modifiable area of a boundary of a far-distance part and a near-distance part in terms of a contact lens for presbyopia according to an embodiment of the present invention.

Additionally, as illustrated in FIG. 2, when a central angle of a sector of the far-distance part 41 increases or decreases, and a central angle of a sector of the near-distance part 42 increases or decreases, areas of the far-distance part and the near-distance part, which are symmetrical in a left-right direction and asymmetrical in an up-down direction, may be formed. That is, if far-distance sight is usually used, a sector area of the far-distance part increases so as to expand a scope for providing far-distance sight, and if near-distance sight is usually used, a sector area of the near-distance part increases so as to expand a scope for providing near-distance sight.

As described above, when it comes to the optical area 40, the far-distance part 41 and the near-distance part 42 provides a far-distance refractive index or a near-distance refractive index in the range of a central angle of a sector of 90 to 270 degrees. The transition part 43 between the far-distance part and the near-distance part forms a central angle of a sector in the range of 3 to 7° degrees diplopia so as to minimize frequency of side effects such as double vision, lunar halos, light sensitivity.

The expansion of the far-distance part 41 leads to expansion of the range of vision when things at a far distance are seen. Accordingly, if the far-distance part of a lens is expanded, the quality of sight with respect to a wide range may be improved. On the contrary, even when the angle of the near-distance part of a lens is reduced, this causes little discomfort in sight because the near-distance part 42 provides a narrow range of vision. That is, various central angles of sectors of the far-distance part and the near-distance part of a contact lens may be formed depending on the ranges in which things are seen.

Meanwhile, a contact lens 10 of the present invention may form different far-distance and near-distance refractive indices between both eyes. That is, eyes are divided into two. An eye that is usually used (an eye that can clearly see things) is a dominant eye while the other eye is a non-dominant eye. Then refractive indices of a far-distance part and a near-distance part are configured to be different with respect to the dominant and non-dominant eyes. To test a dominant eye, both eyes are opened, both hands are placed in front of a face and form a triangle, and an object at a far distance is gradually placed in the middle of the triangle. When each eye is covered, the eye where the object is placed in the triangle is a dominant one.

For instance, in terms of refractive indices in the optical area at the time of wearing the lens, the far-distance part of a dominant eye is configured as 0 D that is emmetropia; the near-distance part of a dominant eye is configured as −0.75 D; the far-distance part of a non-dominant eye is configured as −0.50 D; the near-distance part of a non-dominant eye is configured as −2.25 D. Thus, a blend zone, where both eyes have common refractive indices ranging from −0.50 D to −0.75 D, may be formed.

Figure 3A:
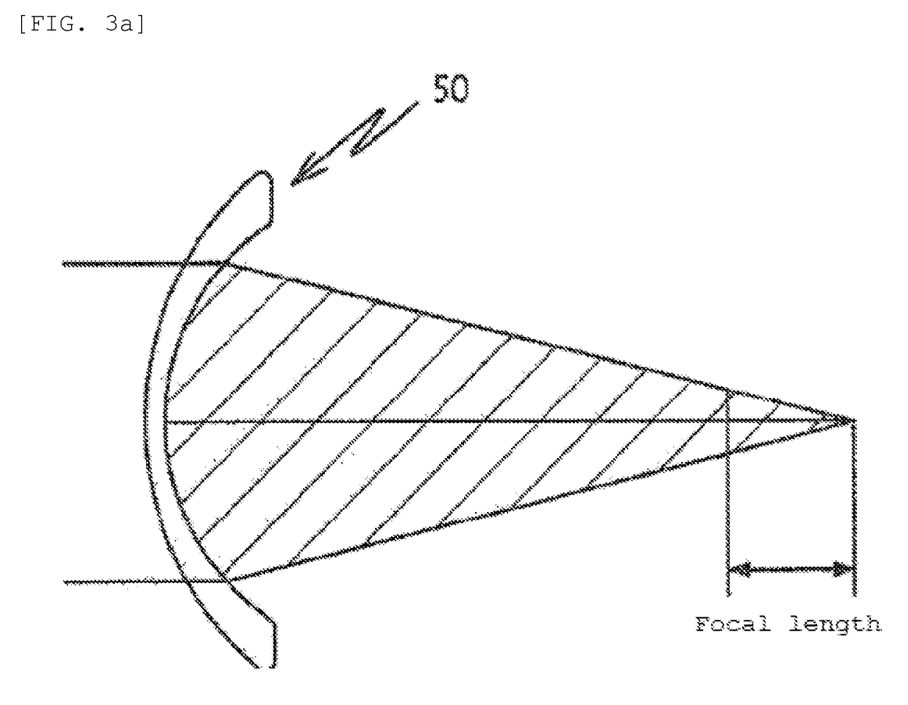
FIGS. 3a and 3b are sectional views of a usual single focus lens.
Figure 3B:
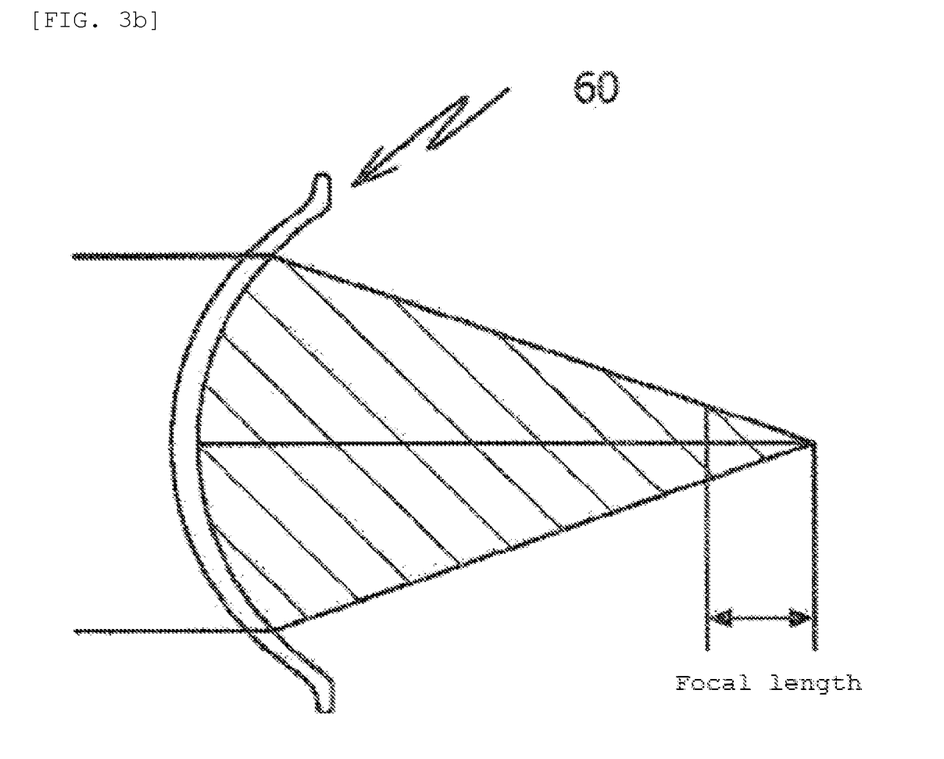
Figure 3C:
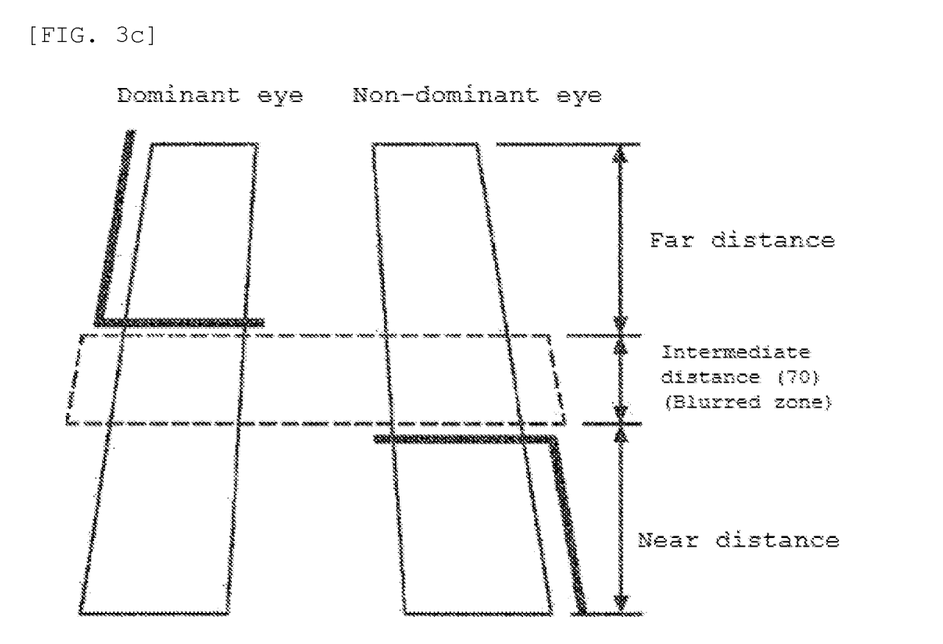
FIG. 3c is a schematic view of a vision range of a traditional contact lens for presbyopia such as a single focus lens, a bifocal lens, or a multi focus lens.

FIG. 3a is a view of a usual far-distance single focus lens 50. As illustrated in FIG. 3a, focal length with respect to a far distance is configured to be short. FIG. 3b is a view of a usual near-distance single focus lens 60. As illustrated in FIG. 3b, focal length with respect to a near distance is configured to be short. If a mono vision method in which both eyes have different refractive indices with such a single focus lens is applied, focal depths of a far distance and a near distance are short, as illustrated in FIG. 3c. Thus, an intermediate distance 70 between the focal depths of a far distance and a near distance is out of focus, and a blurred zone where an image formed on the eye is blurred is created, thereby dropping visual acuity of both eyes.

Certainly, a far-distance part and a near-distance part are formed on one lens, and a transition part is formed between the far-distance part and the near-distance part so as to prevent a rapid change in a refractive index. However, it is hard for the transition part to provide good sight, a section of the transition part is simultaneously formed at a portion of the intermediate distance in both eyes, and phenomena such as double vision, lunar halos or light sensitivity takes place. Thus, it is hard to provide continuous sight according to a focus.

Figure 4A:
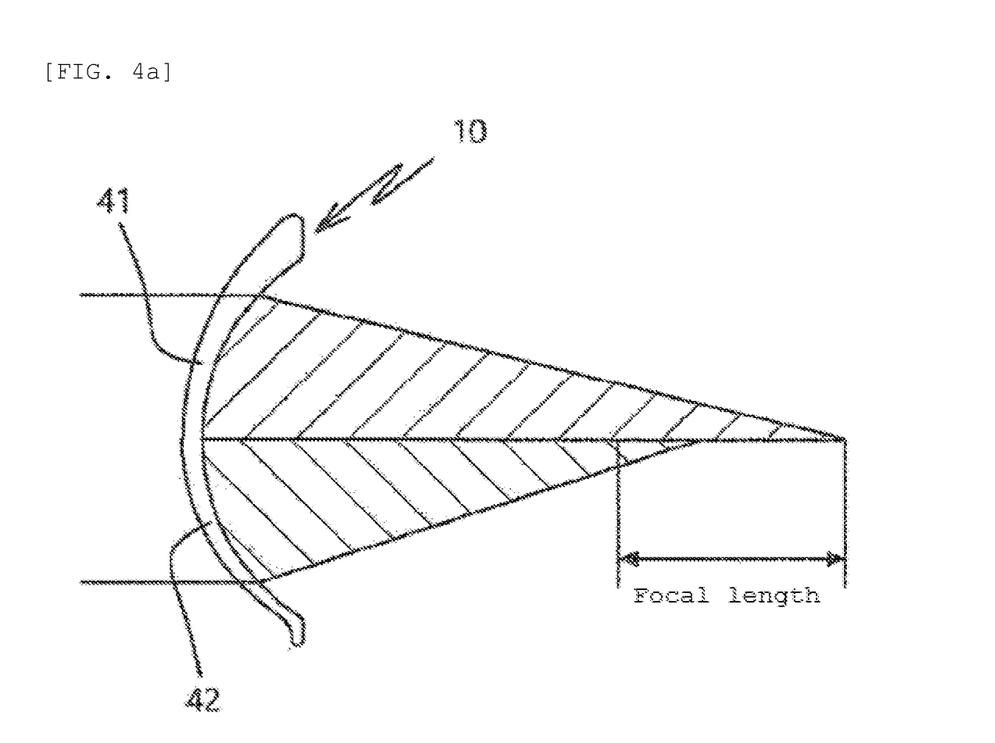
FIGS. 4a and 4b are sectional views of a contact lens for presbyopia of the present invention, and a schematic view of a vision range of a contact lens for presbyopia of the present invention.

According to a contact lens for presbyopia 10 of the present invention, as illustrated in FIG. 4a, a far-distance part 41 and a near-distance part 42 are arranged in an up-down direction, refractive indices of the far-distance part and near-distance part are formed within a certain range, and an integrated focal depth increases such that visual acuity at an intermediate distance is improved.

If the focal depth increases, continuous sight may be provided from a far distance to a near distance at the time of providing different refractive indices in both eyes.

Figure 4B:
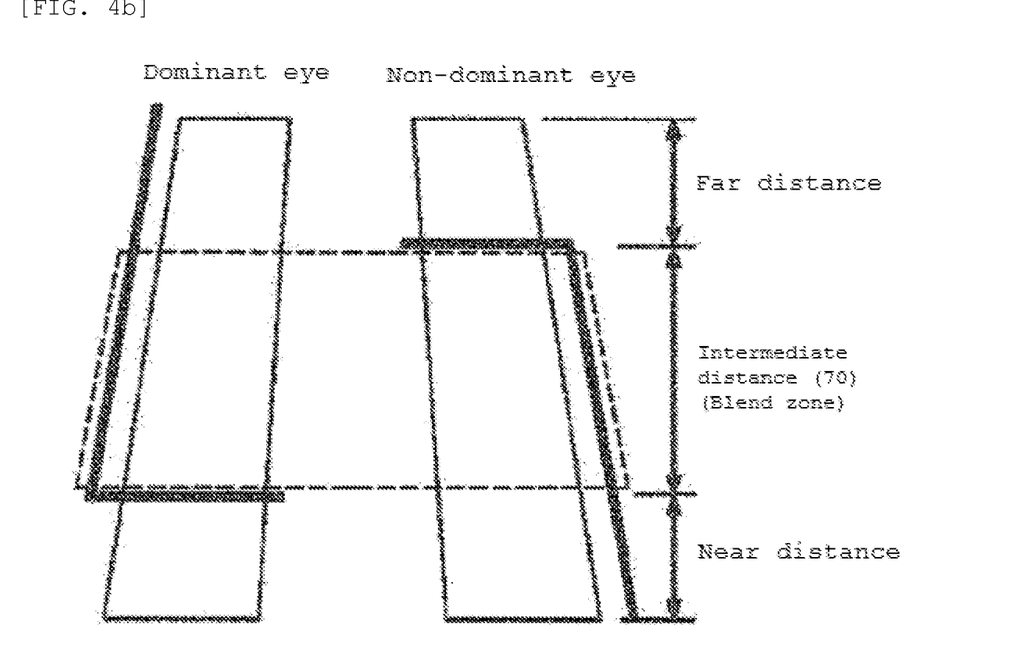

That is, if a different range of refractive indices, as illustrated in FIG. 4b, is formed for a dominant eye and a non-dominant eye at the time of wearing a lens. A blend zone, where a focal depth or a refractive index becomes identical at an intermediate distance 70 of the dominant eye and non-dominant eye, is created because of an increased focal depth. Thus, intermediate-distance visual acuity may be improved.

A far-distance contact lens and a near-distance contact lens worn on both eyes are configured to have a different range of refractive indices using a contact lens for presbyopia, whose focal depth is increased, and differences in the degrees of the far-distance and near-distance contact lenses are configured to be small. Thus, a blend zone, which is an intermediate distance 70 at which sizes of the images formed on both eyes become identical, exists, such that sizes of the images formed on both eyes become identical and intermediate-distance visual acuity is improved through the blend zone.

Additionally, there is a difference in clarity of the image formed on the eyes at a far distance and a near distance excluding an intermediate distance, but sizes of multiple images do not look largely different, and only a clear image is selected and recognized through an innate binocular neural adaption system. Thus, clear sight may be obtained. That is, when two images are formed on both eyes that are binocular neural adaptation systems, the neural gate instantly selects a clearer image so as to obtain the most effective recognition. Therefore, clear sight may be provided in all areas from a far distance to a near distance because a clear image may be obtained at a far distance and at a near distance in addition to a blend zone, and visual acuity is improved.

Figure 5A:
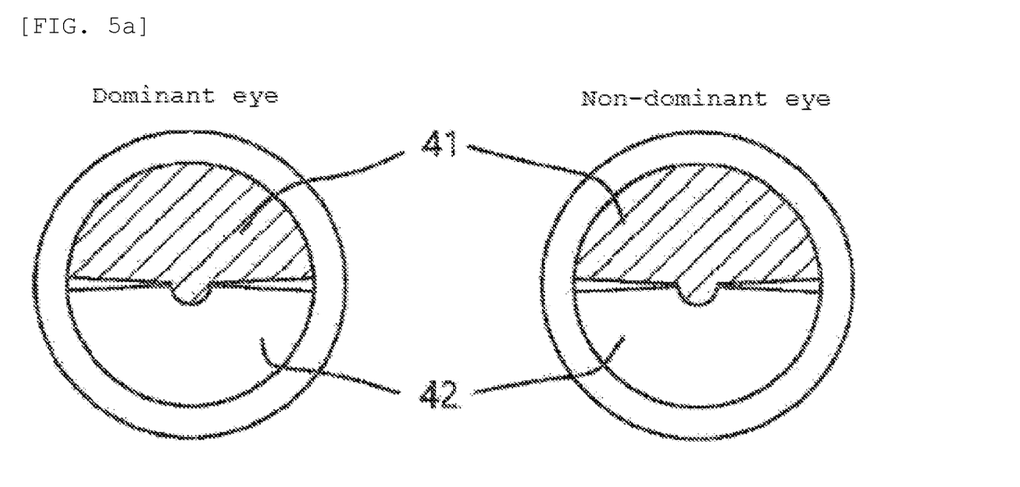
FIGS. 5a to 5d are plane views of modified examples of a contact lens for presbyopia of the present invention according to various angles.

When the far-distance part and the near-distance part of both eyes are configured to have different refractive indices, central angles of the sectors of the far-distance part 41 and the near-distance part 42 of both eyes, as illustrated on the left side of FIG. 5a, are configured to be close to 180 degrees so as to have an identical proportion in an up-down direction.

Figure 5B:
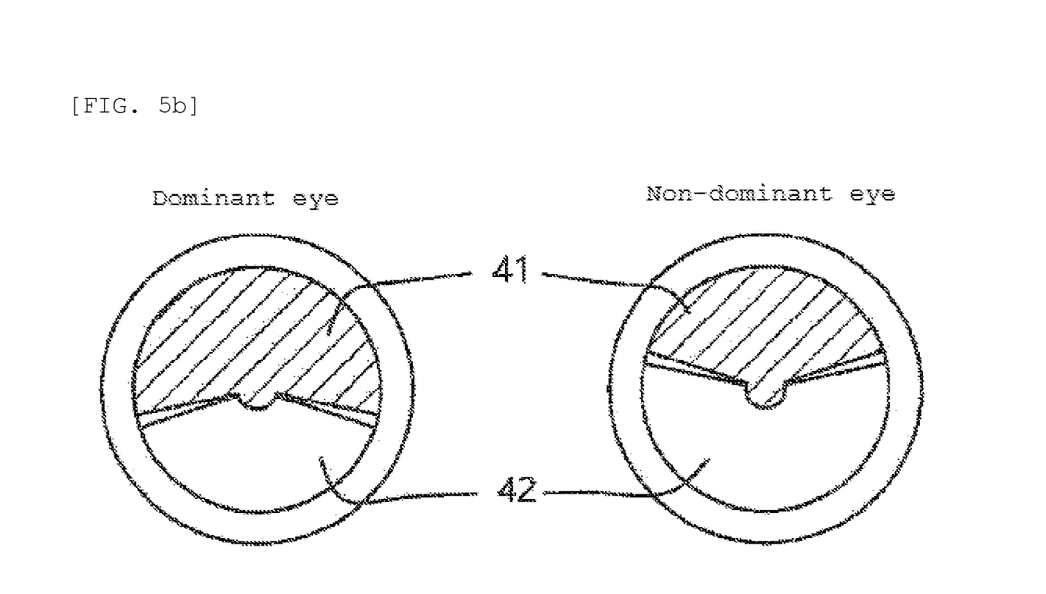

Additionally, in the case of a dominant eye that usually provides far-distance sight, as illustrated in FIG. 5b, a central angle of the sector of the far-distance part 41 at an upper portion is increased while a central angle of the sector of the near-distance part 42 at a lower portion is decreased. In the case of a non-dominant eye that usually provides near-distance sight, as illustrated on the right side of FIG. 5b, a central angle of the sector of the far-distance part 41 at an upper portion is decreased while a central angle of the sector of the near-distance part 42 at a lower portion is increased. Preferably, central angles of the sectors of the far-distance part and near-distance part of a dominant eye are respectively configured to be 210 degrees and 150 degrees while central angles of the sectors of the far-distance part and near-distance part of a non-dominant eye are respectively configured to be 150 degrees and 210 degrees.

Figure 5C:
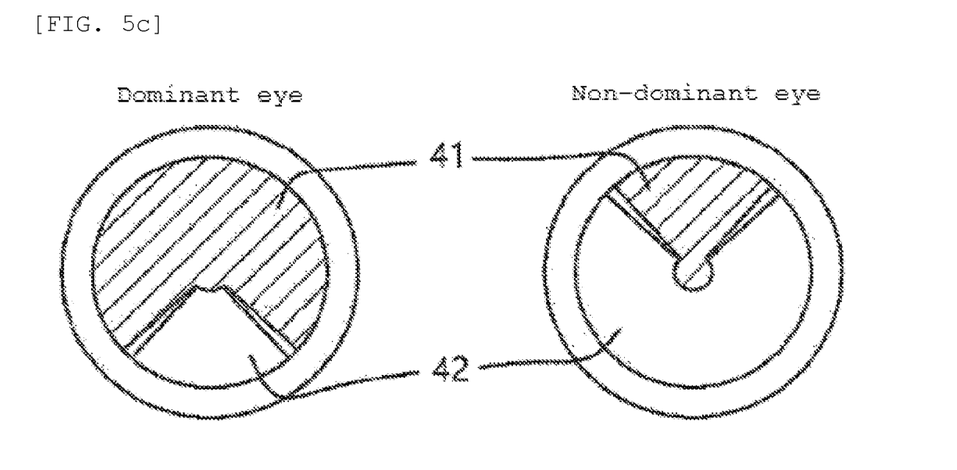

Additionally, in the case of a dominant eye, the far-distance part 41, as illustrated on the left side of FIG. 5c, may be expanded as much as possible while in the case of a non-dominant eye, the near-distance part 42, as illustrated on the right side of FIG. 5c, may be expanded as much as possible. Preferably, central angles of the sectors of the far-distance part and near-distance part of a dominant eye are respectively configured to be 270 degrees and 90 degrees while central angles of the sectors of the far-distance part and near-distance part of a non-dominant eye are respectively configured to be 90 degrees and 270 degrees.

Figure 5D:
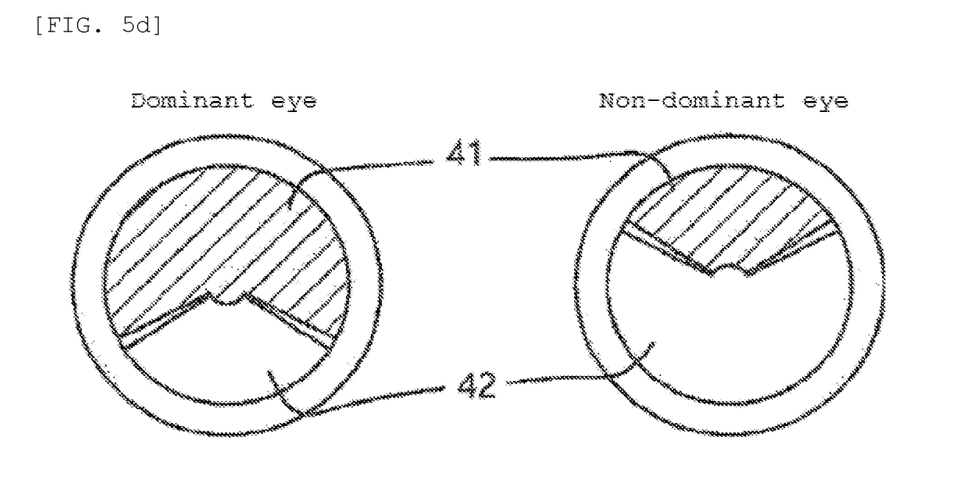

Further, various angles ranging from 180 degrees to 270 degrees, as illustrated in FIG. 5d, are provided such that visual acuity is improved. Preferably, angles of the far-distance part and near-distance part of a dominant eye are respectively configured to be 240 degrees and 120 degrees while angles of the far-distance part and near-distance part of a non-dominant eye are respectively configured to be 120 degrees and 240 degrees.

Most preferably, as illustrated in FIG. 5b, the far-distance part and near-distance part of a dominant eye form refractive indices respectively in a 210 degree range and a 150 degree range so as to be symmetrical in a left-right direction, the far-distance part and near-distance part of a non-dominant eye provide refractive indices respectively in a 150 degree range and a 210 degree range so as to be symmetrical in a left-right direction, and the transition part alleviates differences in thickness in a range of 3 to 7 degrees.

According to the present invention, the far-distance parts 41 and near-distance parts 42 of two contact lenses worn on both eyes are configured to be asymmetrical to each other. Thus, both eyes have different refractive indices in some sections. However, differences in the degrees of the far-distance part and near-distance part in each contact lens are configured to be small, focal depths of the far-distance part and near-distance part in each contact lens are continuously arranged such that an integrated focal depth is increased, a section where focal depths of both eyes become identical is created at an intermediate distance, vision of both eyes is improved, and visual acuity at the intermediate distance is improved. Additionally, if any one of both eyes is out of a focal depth, and a blurred image is provided, a clear image of the two images formed on both eyes is selected and recognized through a binocular neural adaption system. Thus, clear sight may be provided at a far distance, at an intermediate distance, and at a near distance.

Figure 6A:
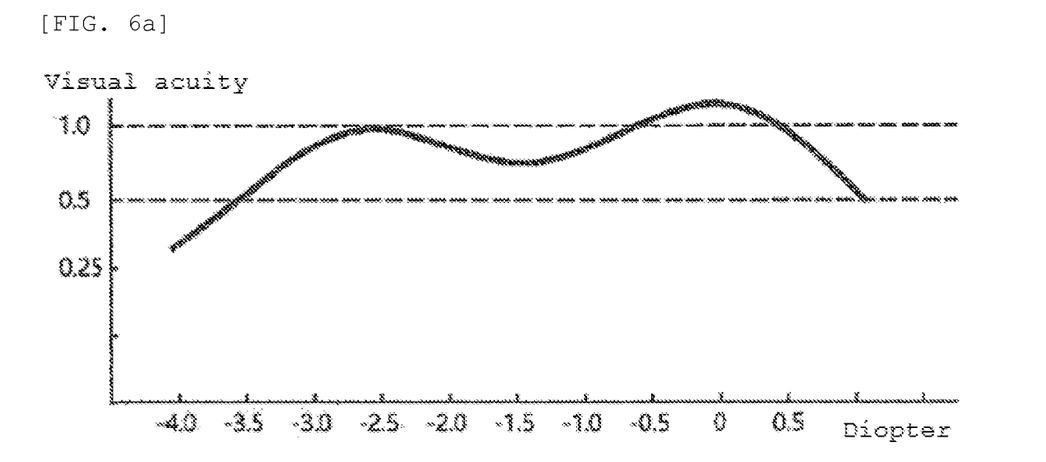
FIG. 6a is a graph of defocus of both eyes, which illustrates improved visual acuity at all distances according to a preferred embodiment of the present invention.

FIG. 6a is a graph of defocus of vision of both eyes on which contact lenses of the present invention, manufactured in a range the same as that in FIG. 5b, are worn. As illustrated, good eyesight is provided at a far distance, and balanced eyesight is also provided at an intermediate distance and a near distance. Thus, focus is formed at most distances, and balanced and natural eyesight is formed.

Figure 6B:
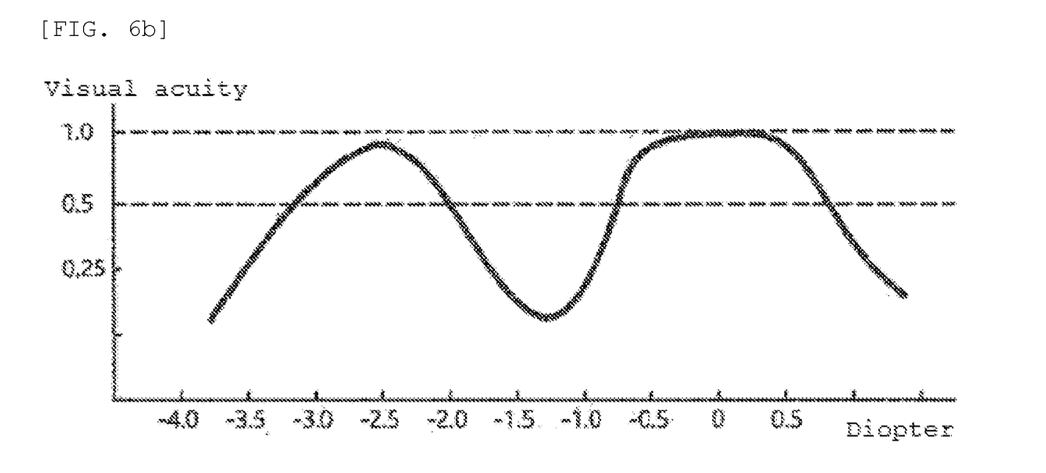
FIGS. 6b and 6c are graphs of defocus of both eyes on which a traditional multi focus lens and a traditional single focus lens are worn.
Figure 6C:
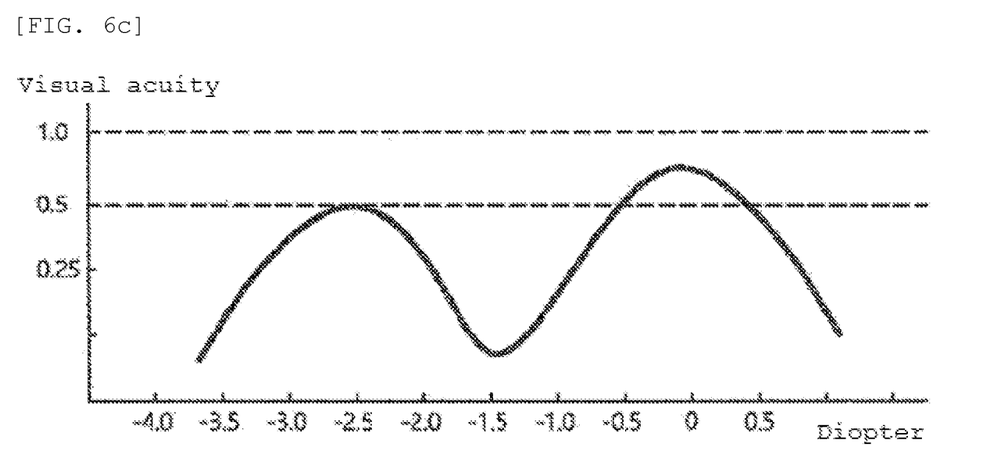

FIGS. 6b and 6c are graphs of defocus of vision of both eyes on which a traditional multi focus lens for presbyopia and single focus lens for presbyopia are worn. As illustrated, visual acuity rapidly drops at an intermediate distance.

Intermediate-distance sight of the present invention is better than that of a traditional method, and width in sight is narrowed in an entire area, such that a wearer easily adapts.

Experiment 1) Comparison of Visual Acuity with Respect to a Refractive Index

Visual acuity is measured with respect various refractive indices of a contact lens.

According to Embodiment 1, both eyes are divided into a dominant eye and a non-dominant eye. An optical area of the contact lens is configured to be in a 180 degree angle, is divided into a far-distance part at an upper portion and a near-distance part at a lower portion in an up-down direction, and is configured to have refractive indices listed in Table 1.

In Comparative example 1, the left and right eyes all have the same refractive index, and a multi focus lens with a far distance at the center, a near distance at the edge, and an intermediate distance between the center and the edge have the refractive indices listed in Table 1.

In Comparative example 2, the left and right eyes all have the same refractive index, and a multi focus lens with a far distance at the center and a near distance at the edge, have the refractive indices listed in Table 1.

In Comparative example 3, both eyes are divided into a dominant eye and a non-dominant eye, and a one-eye contact lens in which only refractive indices of both eyes are different is configured to have refractive indices listed in Table 1.

TABLE 1

|  | Dominant eye | | | Non-dominant eye | | |
| --- | --- | --- | --- | --- | --- | --- |
|  | Far distance | Intermediate distance | Near distance | Far distance | Intermediate distance | Near distance |
| Embodiment 1 | 0.00 | — | −0.75 | −0.50 | — | −2.25 |
| Comparative example 1 | 0.00 | −1.50 | −3.00 | 0.00 | −1.50 | 3.00 |
| Comparative example 2 | 0.00 | — | −2.50 | 0.00 | — | −2.50 |
| Comparative example 3 | 0.00 | — | — | — | — | −2.50 |

Near-distance vision (Jaeger method), intermediate-distance vision (decimal method), and far-distance vision (decimal method) of 20 patients with presbyopia in their fifties are measured using contact lenses having refractive indices listed in Table 1, three-dimensional effects and degrees of adaptation are expressed in five grades ranging from the lowest to the highest, the question of whether there is a blurred area or not is checked, and an average value is listed in Table 2.

TABLE 2

|  | Near-distance vision | Intermediate-distance vision | Far-distance vision | Three-dimensional effect (1~5) | Blurred area | Degree of adaptation (1~5) |
| --- | --- | --- | --- | --- | --- | --- |
| Embodiment 1 | J2 | 1.0 | 1.0 | 4 | x | 6 |
| Comparative example 1 | J2 | 0.8 | 1.0 | 2 | ○ | 2 |
| Comparative example 2 | J2 | 0.1 | 1.0 | 1 | ○ | 2 |
| Comparative example 3 | J2 | 0.1 | 1.0 | 1 | ○ | 2 |

As in Table 2, Embodiment 1 shows good results in terms of intermediate-distance vision, a three-dimensional effect, and a degree of adaptation. Additionally, when it comes to Embodiment 1, there is no blurred area. As a result, a clear image is provided in the entire vision area.

Comparative example 1 shows improved intermediate-distance vision. However, Comparative examples 1 to 3 show that there is a blurred area due to a refractive index vacuum area on both eyes and that there is a refractive index vacuum area. Additionally, Comparative examples 1 to 3 show a low grade in terms of a three-dimensional effect and a degree of adaptation.

Experiment 2) Comparison of Visual Acuity with Respect to the Scopes of a Far Distance and a Near Distance In the optical area of the contact lens, angles of formation of a far distance part and a near distance part with respect to a dominant eye and a non-dominant eye are set as listed in Table 3. In this case, the angels are symmetrical in a left-right direction on the basis of a vertical line passing through the center, and the refractive indices of the dominant eye and non-dominant eye is set as listed in Embodiment 1. Embodiment 2 is manufactured as in FIG. 5b, Comparative example 4 as in FIG. 5a, Comparative example 5 as in FIG. 5c, and Comparative example 6 as in FIG. 5d.

TABLE 3

|  | Dominant eye | | Non-dominant eye | |
| --- | --- | --- | --- | --- |
|  | Far-distance (angle) | Near-distance (angle) | Far-distance (angle) | Near-distance (angle) |
| Embodiment 2 | 210 | 150 | 150 | 210 |
| Comparative example 4 | 180 | 180 | 180 | 108 |
| Comparative example 5 | 270 | 90 | 90 | 270 |
| Comparative example 6 | 240 | 120 | 120 | 240 |

Near-distance vision (Jaeger method), intermediate-distance vision (decimal method), and far-distance vision (decimal method) of 20 patients with presbyopia in their fifties are measured using contact lenses having angles listed in Table 3, three-dimensional effects and degrees of adaptation are expressed in five grades ranging from the lowest to the highest, and an average value is listed in Table 4.

TABLE 4

|  | Near-distance vision | Intermediate-distance vision | Far-distance vision | Three-dimensional effect (1~5) | Degree of adaptation (1~5) |
| --- | --- | --- | --- | --- | --- |
| Embodiment 2 | J2 | 1.0 | 1.0 | 4 | 5 |
| Comparative example 4 | J3 | 1.0 | 0.8 | 4 | 5 |
| Comparative example 5 | J2 | 0.8 | 1.0 | 2 | 2 |
| Comparative example 6 | J2 | 0.8 | 1.0 | 3 | 3 |

As listed in Table 4, Comparative example 4, where a far-distance part and a near-distance part are divided at an identical angel, shows worse near-distance vision and far-distance vision than Embodiment 2.

Further, Comparative examples 5 and 6, where a far-distance angle of the dominant eye and a near-distance angle of the non-dominant eye increase, show grades lower than Embodiment 2 in terms of intermediate-distance vision, three-dimensional effects and degrees of adaptation.

As a result, when the refractive indices of a far distance and a near distance are formed in an angle range of Embodiment 2, the best quality of vision may be obtained.

The invention claimed is:

1. A contact lens for presbyopia, which has a far-distance part having a far-distance refractive index, and a near-distance part having a near-distance refractive index, both of which are respectively formed in divided areas of the contact lens, comprising;
    a central area configured as a far-distance refractive index and providing a main visual field, the central area including a constant diameter of 1.6 millimeters;
    a finish area having a ring shape and formed along an edge of the contact lens;
    an optical area formed between the central area and the finish area and having refractive power so as to provide a vision area,
    wherein the optical area divides the far-distance part that is an upper area and the near-distance part that is a lower area, and a transition part with a certain width is formed at a boundary between the far-distance part and the near-distance part, the transition part extending from the finish area to the central area,
    wherein the far-distance part and the near-distance part has a sector shape with a certain angle, respectively, and are divided in relation to the transition part,
    wherein in instances in which the optical area is a dominant eye, the far-distance part and near-distance part form refractive indices respectively in a 90-210 degree range and a 90-150 degree range so as to be symmetrical in a left-right direction, and
    in instances in which the optical area is a non-dominant eye, the far-distance part and near-distance part provide refractive indices respectively in a 90-150 degree range and a 90-210 degree range so as to be symmetrical in a left-right direction, and the transition part is in a range of 3 to 7 degrees,
    wherein in instances in which the optical area is the dominant eye, an intended refractive index of the far-distance part is configured as emmetropia, an intended refractive index of the near-distance part of the dominant eye is configured as −0.75 D (diopter); and
    in instances in which the optical area is the non-dominant eye, an intended refractive index of the far-distance part is configured as −0.50 D, an intended refractive index of the near-distance part of the non-dominant eye is configured as −2.25 D.

* * * * *